United States Patent [19]

Nakada et al.

[11] Patent Number: 4,609,944
[45] Date of Patent: Sep. 2, 1986

[54] AUTOMATIC FOCUS CONTROL SYSTEM FOR VIDEO CAMERA

[75] Inventors: Yasuo Nakada; Yukihiro Kato, both of Kanagawa, Japan

[73] Assignee: Sony Corporation, Tokyo, Japan

[21] Appl. No.: 613,571

[22] Filed: May 24, 1984

[30] Foreign Application Priority Data

May 25, 1983 [JP] Japan ................... 58-90697

[51] Int. Cl.4 ............... H04N 5/238; H04N 5/232
[52] U.S. Cl. ................... 358/228; 358/227; 354/402; 354/406
[58] Field of Search ............ 358/213, 228, 227, 212; 354/406, 407, 402

[56] References Cited

U.S. PATENT DOCUMENTS 4,240,726 12/1980 Wick ..................... 354/407
4,414,575 11/1983 Yamamoto et al. .......... 358/213
4,420,773 12/1983 Toyoda et al. ............. 358/213

Primary Examiner—Gene Z. Rubinson
Assistant Examiner—Stephen Brinich
Attorney, Agent, or Firm—Lewis H. Eslinger; Alvin Sinderbrand

[57] ABSTRACT

An automatic focus control system for a video camera comprises a main optical system for conducting light from an object and including an adjustable diaphragm for adjusting the amount of light conducted therethrough, a beam splitter disposed in the main optical system for diverting a portion of the light from the main optical system into an optical subsystem which has a second adjustable diaphragm for adjusting the amount of light conducted through the optical subsystem, a converter for converting the portion of the light diverted through the optical subsystem into focusing signals, and an automatic focus control circuit including a contrast detecting circuit for detecting a focused state of the light from the object in response to the focusing signals.

9 Claims, 3 Drawing Figures

AUTOMATIC FOCUS CONTROL SYSTEM FOR VIDEO CAMERA

BACKGROUND OF THE INVENTION

1. Field of the Invention

This invention relates to an automatic focus control system for video cameras in which the effective diameter of the diaphragm of the optical sub-system is changed in dependence upon the focused state of the optical main system for detecting a focused point for the optical main system and the direction in which the main system is defocused.

2. Description of the Prior Art

Various methods are known in the art for detecting a focused point for effecting automatic focus control of an optical system used in a video camera or an optical film camera, such as the active type detecting method which makes use ultrasonic sound or infrared light projected to and reflected back from the object, or the passive type method which makes use of natural light reflected back from the object.

When an ultrasonic wave is used for detecting focusing with respect to a distant object, it is difficult to effect precise detection because of the lower directivity of the ultrasonic wave. When an infrared light is used, power consumption of the infrared light source is considerably increased, which is not desirable for a video camera which makes frequent use of a lens with a larger zoom ratio. In the passive type detecting method, there are known a correlation method in which the object image is split and the correlation of the resulting images is scrutinized and a sharpness method in which sharpness of the object image is used for detecting focusing of the optical system. These methods are devoid of the inconveniences as not in the passive type method because natural light is used. However, in the correlation method, sensors of delicate and complex construction are required thus causing elevated costs. In addition, there is the risk of malfunction when the object is complex or the object image consists of a repetition of patterns. In the sharpness method, it is difficult to precisely determine the direction in which the optical system is deviated from the focused point. It is also known to combine the correlation and sharpness methods; however, there is an inconvenience that the method requires a complicated optical system and a complicated processing circuit for output signals.

In still cameras taking shots of still images, correct shooting can be achieved by operating the shutter in the correctly focused state of the optical system, even when the automatic focus control system shows only poor response properties. However, in video cameras taking a sequence of consecutive shots, imaging signals are outputted even when the optical system is in the defocused state and the images of inferior quality are reproduced on, for example, the screen of a monitor television receiver. Thus in effect, the quality of the output image is governed directly by the properties of the automatic focus control system.

BRIEF SUMMARY AND OBJECT OF THE INVENTION

It is an object of the present invention to provide an automatic focus control system for a video camera capable of producing an image output of superior quality.

It is a further object of the present invention to provide an automatic focus control system for a video camera capable of precisely and stably detecting the focused state and the direction of defocusing of the optical system.

It is thus a further object of the present invention to provide an automatic focus control system for a video camera capable of promptly setting the optical system to a focused state even when the optical system is in an extremely defocused state.

It is another object of the present invention to provide an automatic focus control system for a video camera capable of effecting highly sensitive and reliable focus control even when the object is lower in brightness and contrast.

Other and further objects, features and advantages of the invention will appear more fully from the following description.

DETAILED DESCRIPTION OF THE INVENTION

Reference is made to the accompanying drawings showing a preferred embodiment of the automatic focusing control system according to the present invention.

Figure 1:
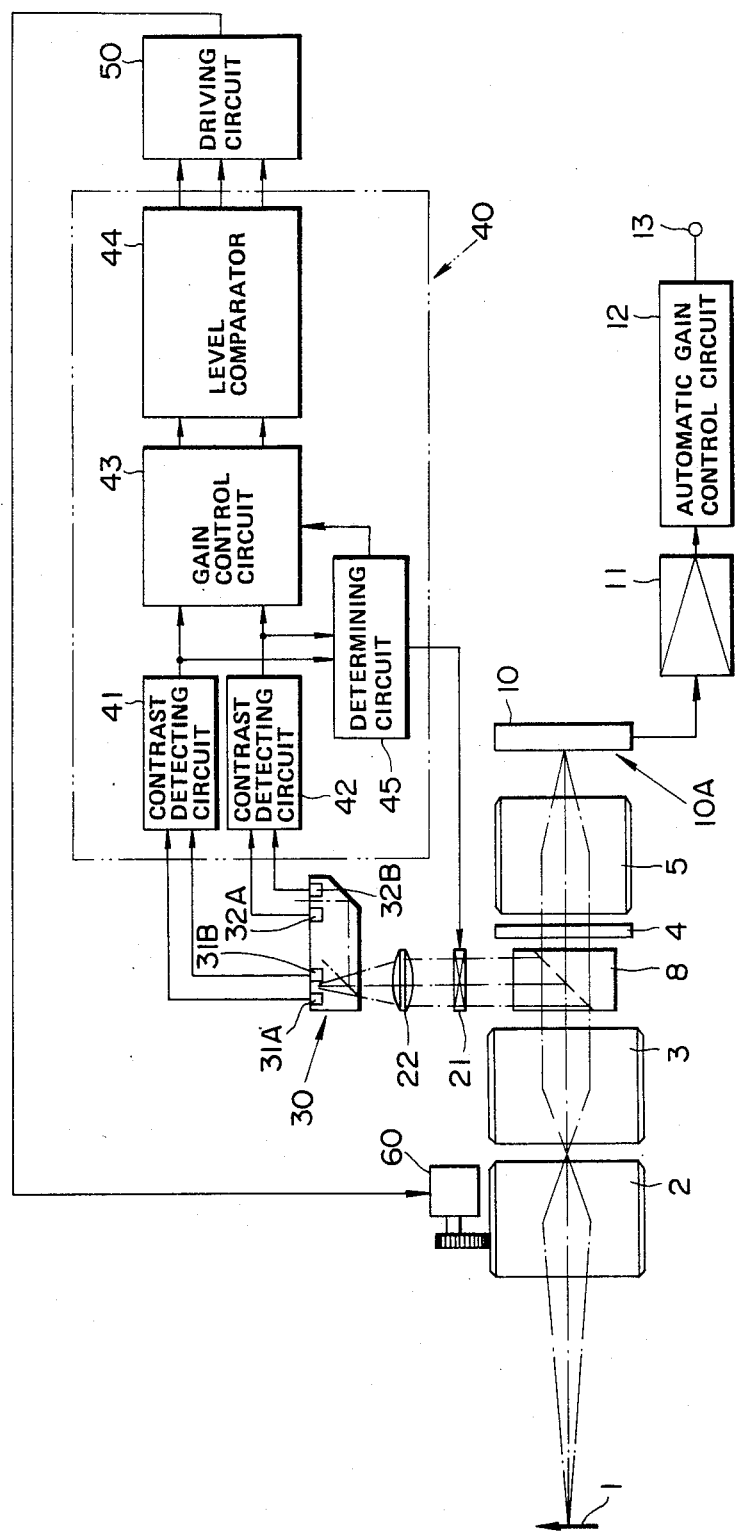
FIG. 1 is a block diagram diagrammatically showing the arrangement of the automatic focus control system for video camera according to the present invention.

FIG. 1 shows in a schematic block diagram the arrangement of an automatic focus control system as applied to a video camera in which a solid-state image sensor formed of charge coupled devices are used for image pickup or shooting.

Referring to this figure, there is shown a main optical system adapted for guiding the light from an object 1 in the direction of an image pickup surface 10A of the solid-state image sensor and comprising a focusing lens unit 2, a zoom lens unit 3 a diaphragm 4 and a relay lens unit 5. The focus lens unit 2 is driven electrically by an electric motor 60. When focused corectly, the main system forms an image of the object on the image pickup surface 10A of the image sensor 10. The diaphragm section 4 is provided in an optical path situated intermediate the zoom lens unit 3 and the relay lens unit 5 of the main optical system, said optical path forming an afocal system in which the light beam is collimated in the focused state of the main system. The diaphragm unit 4 thus situated in the afocal system is used for adjusting the volume of object light to be irradiated on the image pickup surface 10A.

The image output obtained from the solid-state image sensor 10 is taken at a signal output terminal 13 via a buffer amplifier 11 and an automatic gain control circuit 12.

Figure 2:
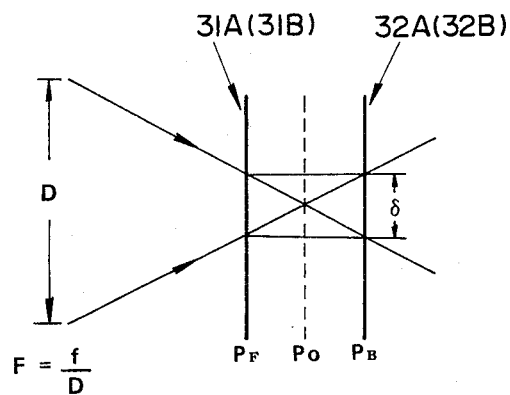
FIG. 2 is a view showing diagrammatically the relative position of the line sensors of the focusing detecting section shown in FIG. 1.

A beam splitter 8 such as a prism is provided in an optical path of the main optical system situated between the zoom lens section 3 and the diaphragm section 4, and thus within the aforementioned afocal system, in such a manner that part of the object light passing through the optical main system is deviated by the prism 8 towards an optical sub-system and thereby directed to a focusing detecting unit 30. The sub-system comprises a diaphragm unit 21 for changing the volume of the object light arriving at the beam splitter 8, and an image forming lens 22 for converging the object light towards the detecting unit 30, which comprises four line sensors 31A, 31B, 32A, 32B each formed by charge-coupled devices. As shown in FIG. 2, the line sensor pair 31A, 31B and the line sensor pair 32A, 32B are mounted parallel to each other in such a manner that the line sensors 31A, 32B, 32A, 32B are positioned at forward position $P_F$ and backward position $P_B$ of the optical sub-system on both sides of a focused point $P_O$ at which a regular object image is to be formed.

It should be noted that the diaphragm unit 21 in the sub-system may be formed by a liquid crystal or the like in which the light volume passing therethrough may be changed by electrical control signals.

In the optical sub-system, which is provided with said diaphragm unit 21, the object light directed to line sensors 31A, 31B, 32A, 32B is converged by the image forming lens 22 to the shape of a blur circle with a diameter $\delta$ which is related to the F-number of the diaphragm section 21.

With the effective diameter D of the diaphragm unit 21 and the focal distance f of the optical sub-system, since $$F = f/D \qquad (1)$$

the diameter of the blur circle is given by a formula $$\delta = \Delta f/F \qquad (2)$$

wherein $\Delta f$ denotes the depth of focus of the optical subsystem.

Figure 3:
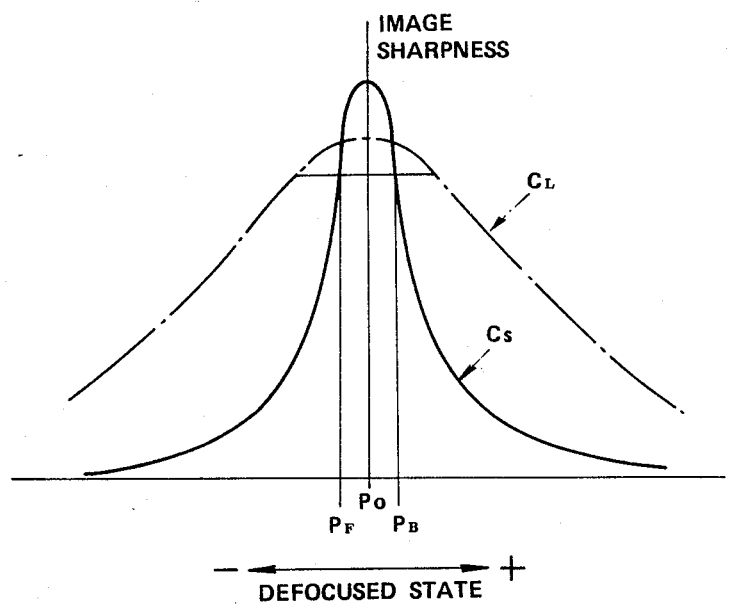
FIG. 3 is a graphic chart showing sharpness characteristics of the object light detected by the detecting section.

The image sharpness resulting from the above described object light is shown by the solid and dotted lines in FIG. 3. As seen from this figure, the evaluation function $C_S$ for a F-number $F_S$ has steeper characteristics with more pronounced sharpness whereas the evaluation function $C_L$ for a larger F-number $F_L$ shows less steep characteristics with less pronounced sharpness. The gradient $\Delta C_S$ of the characteristic curve for the evaluation function $C_S$ is larger than the gradient $\Delta C_L$ for the evaluation function $C_L$ in the neighborhood of the focused point $P_O$ while the gradient $\Delta C_S$ is lesser than the gradient $\Delta C_L$. In this manner, in the markedly defocused state, the focused point $P_O$ can be detected by making use of the aforementioned evaluation function $C_S$, and the direction in which to effect focus control can be detected by making use of the evaluation function $C_S$ in the neighborhood of the focused point $P_O$ and the evaluation function $C_L$ in greatly defocused state thus providing for a highly accurate focus control.

On the basis of the outputs $S_{A1}$, $S_{A2}$ resulting from line sensors 31A, 31B at the above described forward positions, and the outputs $S_{A2}$, $S_{A2}$ resulting from line sensors 32A, 32B at the above described backward positions, an automatic focus control unit 40 detects the focused point and the direction in which to effect focusing by the following operations so as to control the operation of a driving circuit 50 for an electric motor 60 which effects adjustment of the focusing lens unit 2.

The control unit 40 has a first contrast detecting circuit 41 for effecting contrast detection based on the outputs $S_{A1}$, $S_{A2}$ of the line sensors 31A, 31B arranged at the above described forward positions $P_F$ and a second contrast detecting circuit 42 for effecting contrast detection based on the outputs from the line sensors 32A, 32B arranged at the above described backward positions $P_B$. The outputs from the contrast detecting circuits 41, 42 are supplied via automatic gain control circuit 43 to a level comparator 44, the outputs of which are used for controlling the operation of a driving circuit 50 of the motor 60. In the automatic focus control unit 40, there is also provided a circuit 45 for determining the mismatched or defocused state of the optical main system on the basis of outputs from contrast detecting circuits 41, 42. The output from circuit 45 is used for controlling the effective diameter of the diaphragm unit 21 of the optical sub-system.

The contrast detecting circuits 41, 42 detect the contrast of the object image formed by the object light at the forward position $P_F$, and the contrast of the image formed by the object light at the backward position $P_B$. When the optical main system is in focused state, the output signal levels from the detecting circuits 41, 42 are equal to each other. However, when the optical main system is in mismatched state, the signal levels from the respective detecting circuits are changed in accordance with the magnitude of the defocused state. The operation of the driving circuit 50 is controlled by the error output from the level comparator 44 to permit automatic focus control of the focusing lens unit 2 of the optical main system.

When the contrast in the optical sub-system which is detected by the contrast detecting circuits 41, 42 is low, that is, when the optical main system is in defocused state, the circuit 45 acts on the diaphragm unit 21 of the optical sub-system for enhancing the effective diameter to a larger value $F_L$. On the contrary, when the above described contrast is high, that is, when the optical main system is in approximately focused state, the circuit 45 acts on the section 21 for decreasing the effective diameter to a lesser value Fs.

Thus the effective diameter of the diaphragm section 21 of the optical sub-system is adjusted in such a manner that, at the automatic focus control section 40, when the optical main system is in defocused state, the direction in which to effect focus control can be decided over a wider range and with higher sensitivity on the basis of the above described evaluation function $C_L$ for lower sharpness, thus allowing to promptly set the optical main system to the approximately focused state. In the thus set approximately focused state, correct focus control can be effected by using the evaluation function for higher sharpness so as to effect focus control accurately.

Since the volume of the object light directed to the line sensors 31A, 31B is changed by adjustment of the diaphragm unit 21 of the optical sub-system, the outputs from contrast detecting circuits 41, 42 are supplied via automatic gain control circuit 43 to the level comparator 44 for assuring greater precision in the signal comparison operation to be effected at the comparator 44. Alternatively, the desired precision may be assured when the light receiving time or charge storage time intervals of the line sensors 31A, 31B, 32A and 32B are controlled by the output of the circuit 45, in which case the automatic gain control circuit 43 may be omitted. The diaphragm section 21 of the optical sub-system may be controlled by binary switching or continuous switching in accordance with contrast and by means of the output from circuit 45.

In this manner, in the automatic focus control unit 40, the object light volume is controlled at the diaphragm 21 of the optical sub-system, in such a manner that the direction in which to effect focus control may be determined positively over a wider range. The automatic focus control of the optical main system can be effected by accurately detecting the focused point Po and the main system may be set to the approximately focused state even in instances where the main system is in extremely defocused state, thus enabling high quality shooting. The differential type detection of the automatic focus control section 40 is effective to counteract in-phase noise with resulting increase in the signal to noise ratio and in positive and highly sensitive focus control even in instances where the object is low in contrast or brightness.

The automatic focus control system for a video camera according to the present invention provides for changing the effective diameter of the diaphragm unit of the optical sub-system in accordance with the focused or defocused state for detecting the focus point for the main system and the direction in which the main system is defocused, thus allowing to effect automatic focus control.

What is claimed is:

1. An automatic focus control system for adjusting a video camera from an unfocused state to a substantially focused state; said system comprising:
    a main optical system for conducting light from an object;
    a first diaphragm for controlling the volume of light in the main optical system;
    first means for photoelectrically converting the light from said object from the main optical system into an imaging signal;
    an optical subsystem for conducting a part of the light from said object as conducted by said main optical system;
    a second diaphragm for controlling the volume of said light in the optical subsystem;
    second means for converting part of the light from said object from said optical subsystem into focusing signals; and
    an automatic focus control unit including contrast detecting means responsive to said focusing signals and generating a control signal for controlling said second diaphragm in such a manner as to reduce its effective diameter in the unfocused state and enlarge its effective diameter in the substantially focused state.

2. The automatic focus control system for a video camera as in claim 1; wherein said second diaphragm is interposed between said main optical system and said optical subsystem.

3. The automatic focus control system for a video camera as in claim 2; and further comprising a beam splitter for splitting light from said object and supplying same to said main optical system light and said optical subsystem.

4. An automatic focus control system for adjusting a video camera from an unfocused state to a substantially focused state; said system comprising:
    a main optical system for forming an image of an object, said main optical system including an adjustable diaphragm means for adjusting the amount of light conducted therethrough;
    beam splitting means disposed in said main optical system for diverting a portion of said light from said main optical system;
    an optical subsystem for forming an image of said object from said portion of said light diverted from said main optical system by said beam splitting means;
    second adjustable diaphragm means for adjusting the amount of light conducted through said optical subsystem;
    converting means for converting said portion of said light into focusing signals; and
    automatic focus control means including contrast detecting means responsive to said focusing signals for controlling said second diaphragm in such a manner as to reduce its effective diameter in the unfocused state and enlarge its effective diameter in the substantially focused state.

5. The automatic focus control system for a video camera as in claim 4 wherein said contrast detecting means includes first and second contrast detecting circuits for supplying first and second contrast signals, respectively, in response to said light from said object.

6. The automatic focus control system for a video camera as in claim 5 wherein said automatic focus control means includes comparison means for comparing said first and second contrast signals to generate a compared signal.

7. The automatic focus control system for a video camera as in claim 6 and further comprising means for adjusting the focus of said main optical system, and drive circuit means responsive to said compared signal for actuating said means for adjusting.

8. An automatic focus control system for a video camera comprising:
    a main optical system for forming an image of an object, said main optical system including an adjustable diaphragm means for adjusting the amount of light conducted therethrough;
    beam splitting means diaposed in said main optical system for directing a portion of said light from said main optical system;
    an optical subsystem for forming an image of said object from said portion of said light diverted from said main optical system by said beam splitting means;
    second adjustable diaphragm means for adjusting the amount of light conducted through said optical subsystem;
    converting means for converting said portion of said light into focusing signals;
    automatic focus control means responsive to said focusing signals and including contrast detecting means for detecting a focused state of said light from said object by detecting the contrast of said image formed by said optical subsystem at a plurality of points, comparison means for comparing said first and second contrast signals to generate a unimpaired signal, and means responsive to said first and second contrast signals for adjusting said second diaphragm;
    said contrast detecting means including first and second contrast detecting circuits for supplying first and second contrast signals, respectively, in response to said light from said object; and further comprising
    means for adjusting the focus of said optical system, and drive circuit means responsive to said compared signal for actuating said means for adjusting.

9. The automatic focus control system for a video camera as in claim 4 and further comprising second converting means for converting said light from said object from said main optical system into an image signal.

* * * * *